United States Patent [19]
Hogan

[11] Patent Number: 6,091,698
[45] Date of Patent: Jul. 18, 2000

[54] OVERWRITING PHASE CHANGE MEDIA BY VARYING DATA PATTERNS

[75] Inventor: Josh Hogan, Los Altos, Calif.

[73] Assignee: Hewlett Packard Company, Palo Alto, Calif.

[21] Appl. No.: 08/896,004

[22] Filed: Jul. 17, 1997

[51] Int. Cl.[7] ................................................. G11B 7/24
[52] U.S. Cl. .................................... 369/275.2; 369/275.4
[58] Field of Search ............................ 369/275.2, 275.3, 369/275.1, 50, 32, 38, 48, 47, 49, 59, 54, 275.4, 13, 116, 100

[56] References Cited

U.S. PATENT DOCUMENTS

| | | | |
|---|---|---|---|
| 5,150,351 | 9/1992 | Ohno et al. | 369/116 |
| 5,233,589 | 8/1993 | Saito et al. | 369/48 |
| 5,546,365 | 8/1996 | Roth | 369/32 |
| 5,604,727 | 2/1997 | Ishihara | 369/275.3 |
| 5,838,658 | 11/1998 | Nakane et al. | 369/275.4 |
| 5,923,640 | 7/1999 | Takemura et al. | 369/275.3 |
| 5,933,410 | 8/1999 | Nakane et al. | 369/275.3 |

*Primary Examiner*—Ali Neyzari

[57] ABSTRACT

A phase change overwrite system that reduces the phase change material flow which results from the repeated overwrites of the same data on the media. Two techniques can be used to solve the overwrite degradation problem. The first is to exploit the fact that a given data sequence can be represented by multiple bit patterns. This choice in bit patterns is primarily for use in reducing the low frequency content of the bit pattern. However, some of the choice available may be used for other purposes, such as ensuring the same bit pattern is not always used. The second technique is to vary the point in the bit pattern at which writing begins. This is possible in a ROM type format because the new data are written in exactly the same location as the old data. Therefore, if the old data are exactly the same as the new data, it is optional whether or not to overwrite the old data. Note that typically the header information for old and new data is the same. Accordingly, this opportunity for varying the location of where writing begins is available even when the new user data are completely different from the older data.

16 Claims, 5 Drawing Sheets

| i | h(i,1), g(i,1) | h(i,2), g(i,2) | h(i,3), g(i,3) | h(i,4), g(i,4) |
|---|---|---|---|---|
| 0 | 0010000000001001,1 | 0100000100100000,2 | 0010000000001001,1 | 0100000100100000,2 |
| 1 | 0010000000010010,1 | 0010000000010010,1 | 1000000100101000,3 | 1000000100101000,3 |
| 2 | 0100000100100000,2 | 0100000100100000,2 | 1000000000010010,1 | 1000000000010010,1 |
| 3 | 0010000001001000,2 | 0100001001000000,4 | 0010000001001000,2 | 0100001001000000,4 |
| 4 | 0010000001001000,2 | 0010000000010000,2 | 0010000001001000,2 | 1001001000100000,2 |
| 5 | 0010000000100100,2 | 0010000000100100,2 | 1001001000000000,4 | 1001001000000000,4 |
| 6 | 0010000000100100,2 | 0010000000100100,2 | 1001001000000000,4 | 1001001000100000,4 |
| 7 | 0010000001001000,3 | 0100000000010010,1 | 0010000001001000,3 | 0100000000010010,1 |
| 8 | 0010000010010000,3 | 0010000010010000,3 | 1000010010000000,4 | 1000010010000000,4 |

FIG. 3

OVERWRITING PHASE CHANGE MEDIA BY VARYING DATA PATTERNS

BACKGROUND OF THE INVENTION

1. Technical Field

The invention relates to data storage on phase change media. More particularly, the invention relates to the repeated overwriting of the same data on phase change media.

2. Description of the Prior Art

Digital data storage systems such as the Power Drive (PD), Digital Video Disc (DVD), and Compact Disk (CD) rewritable systems, store information on a disc by exploiting the fact that certain materials or compounds can solidify in more than one phase. For example, tellurium (typically in combination with other elements) can solidify in either an amorphous phase or a crystalline phase. The two phases have different optical properties and therefore can be used to store information that can be read optically. These types of materials are typically referred to as phase change materials or phase change media.

In a typical recording scheme, a laser beam is focused onto a small spot in the layer of phase change medium on a spinning disc. If there is sufficient power in the laser beam the phase change medium softens or melts. Depending on whether the medium is cooled quickly or slowly, it solidifies in the amorphous or crystalline phase. The rate of cooling can be controlled by how quickly or slowly the laser power is turned down after melting the medium. This control of the variation of the laser power allows a sequence of amorphous or crystalline marks to be recorded on the disc. By using an appropriate modulating coding scheme, data can be recorded on the medium.

One of the key advantages of phase change recording is that data can be overwritten a large number of times on the phase change media. However, a problem occurs if the same marks are overwritten many times. In that scenario, one portion of the medium is repeatedly solidified in one state, while adjacent portions solidify in the other state. This causes a gradual flow of the phase change material from one portion of the medium to another, resulting in a degradation of the material. This in turn causes a deterioration in the integrity of the recorded data, thereby limiting the number of overwrites that are possible without risking loss of data integrity.

Examples of cases where there is a need for repeated overwriting of the same data include synchronization marks, addresses in headers, and where less than a minimum recordable block (or record unit) has been changed. These cases occur in the DVD format, for example, because it uses a set of synchronization marks that always occur at the same place in the data and although the minimum recordable block is 32K bytes, the host computer may operate in 2K byte sectors. A typical operation may change some sectors of a block, while the remainder are rewritten exactly as before.

In some rewritable formats, this overwrite degradation problem is overcome by varying the "start of the writing position" over a number of bytes. This means the same data are never written in exactly the same location. This solution requires the inclusion in the format of a buffer zone or edit gap. It also involves some loss of capacity and makes a rewritable format incompatible with read only formats. In the case of these formats with buffer zones it is desirable to reduce the size of the buffer zones.

Other formats, such as ROM formats, do not contain edit gaps. It is desirable to be able to write to such formats in order to avoid incompatibilities between formats. The disk written with a "ROM" format would be readable by ROM drives that did not know of edit gaps. To write to such ROM formats requires very accurate overwriting of data blocks such that they begin and end at exactly the same location as the previous data. There is therefore no opportunity to vary the location of data to be overwritten relative to preexisting data. However, it is still desirable to overwrite without causing degradation of the phase change medium.

SUMMARY OF THE INVENTION

The invention provides a phase change media overwrite system. This invention reduces the phase change material flow that results from the repeated overwrites of the same data on the media.

Two techniques can be used to solve the overwrite degradation problem. The first is to exploit the fact that a given data sequence can be represented by multiple bit patterns. This choice in bit patterns is primarily for use in reducing the low frequency content of the bit pattern. However, some of the choices available may be used for other purposes, such as ensuring the same bit pattern is not always used.

The second technique is to vary the point in the bit pattern at which writing begins. This is possible in a ROM type format because the new data are written in exactly the same location as the old data. Therefore, if the old data are exactly the same as the new data, it is optional whether or not to overwrite the old data. Note that typically the header information for old and new data is the same. Accordingly, this opportunity for varying the location of where writing begins is available even when the new data supplied by the user (which does not include header information) are completely different from the older data.

BRIEF DESCRIPTION OF THE DRAWINGS

FIG. 3 is a table showing the Eight-to-Fourteen Modulation Plus (EFMPlus) codeword table for the first nine 8-bit values;

DETAILED DESCRIPTION OF THE INVENTION

Phase change media data storage systems such as the Power Drive (PD), Digital Video Disc (DVD), and Compact Disc (CD) rewritable systems, store information on a disc in a series of zeros and ones which relate to the physical marks on the disk. Marks correspond to high or low reflectivity areas of the phase change media. The beginning and ending of a mark corresponds to a 1 in an associated bit stream. Only the transition from a high reflectivity mark to a low reflectivity mark has significance. Thus, one aspect of the invention exploits inversion of mark polarity The actual polarity of the mark has no significance. As the marks are repeatedly overwritten on the media with the same patterns, a gradual flow of the phase change material from one portion to another can occur, resulting in the degradation of the material and deterioration in the integrity of the recorded data.

Figure 1:
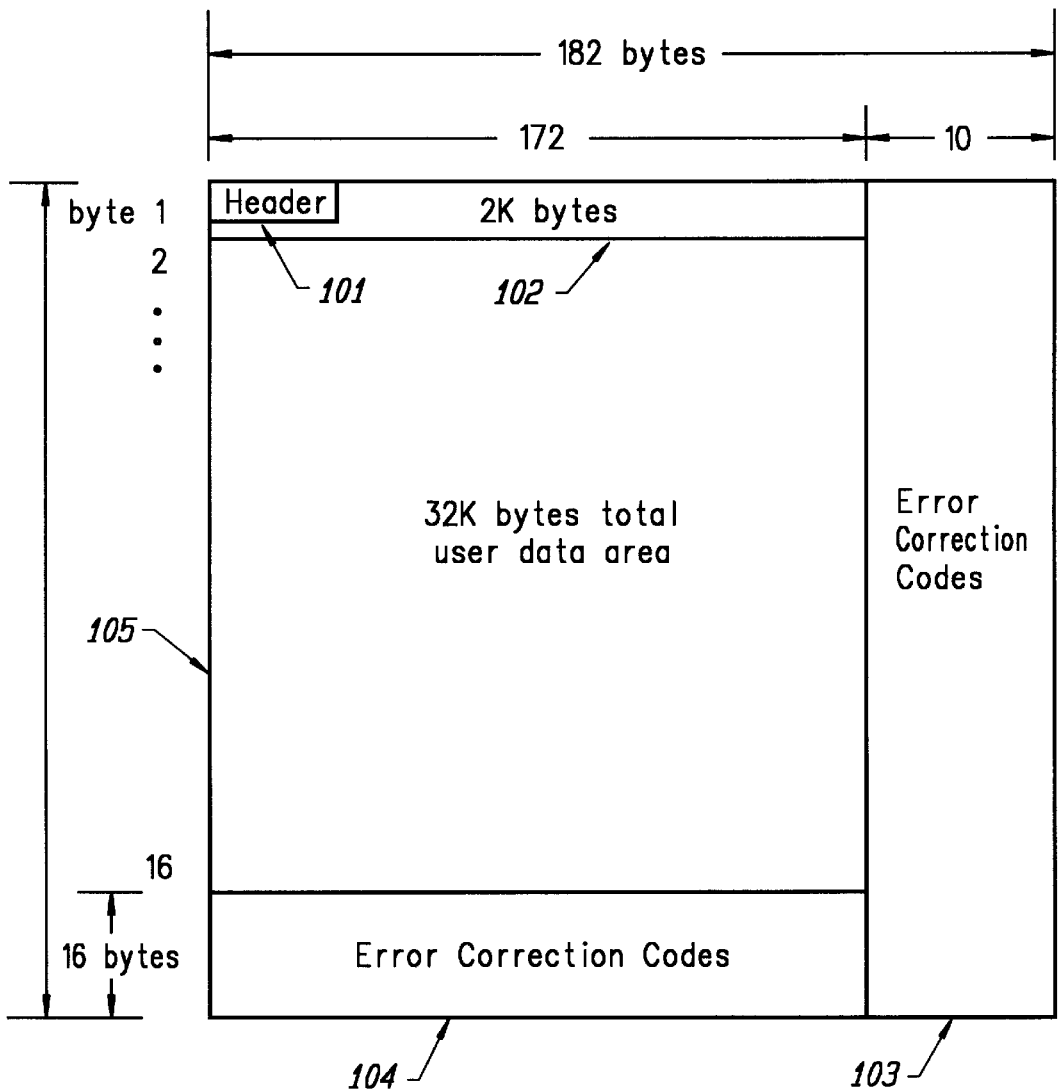
FIG. 1 is a block diagram showing the data layout of a Digital Video Disk (DVD) data block.

For example, referring to FIG. 1, which is a simplified form of the DVD format, user data are divided into 32K bytes 105. There are error correction codes (ECC) associated with each row 103 and each column 104 in a two dimensional array. The overall size of the data block is 208 bytes by 182 bytes. The length of the data block is 182 bytes, of which 172 bytes are user data 105 and the remaining ten bytes are ECC 103 that are added for error recovery. Similarly, the number of rows is 208 with the last sixteen lines consisting of another set of ECC codes 104. Within the 32K byte user data section 105, there are sixteen 2K byte sectors 102. Each 2K byte data sector 102 contains an area reserved for header information 101. The header information 101 is approximately ten bytes in length.

Some formats, such as DVD format, allow for random access of each data block. In the DVD format, for example, each 32K byte block is independent because each block contains its own ECC which allows errors that occur in the block to be corrected without having to go outside of the block for additional information. This was a deliberate design decision to make it an updatable, random accessible, erasable disk.

Figure 2:
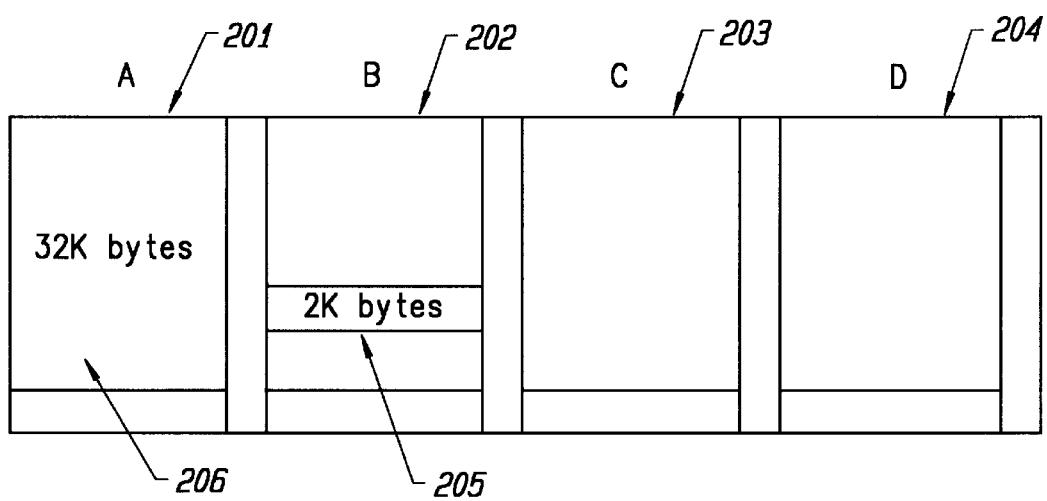
FIG. 2 is a block diagram showing the data block layout for the DVD format.

With respect to FIG. 2, a consequence to this design is that if a 2K byte sector 205 of data is modified, the full 32K bytes 202 must be rewritten because the ECC must be recalculated over that whole area. The 2K bytes is a fairly logical size for the computer environment and in the DVD format it is automatically translated into a 32K byte block. The 2K byte sector 205 is seen as residing in a particular 32K block, in this example, block B 202. To update the 2K byte sector 205, block B 202 is read and the new 2K bytes is substituted for the old 2K bytes. The ECC is recalculated for block B 202 and the entire block B 202 is written back onto the media.

Because only a portion of block B202 may only need to be changed (e.g. 2K out of 32K), old data is frequently overwritten with the same new data. Furthermore, the header information of all 2K byte sector is typically unchanged, so in any event this header information is always rewritten with the same data as was previously written.

Typically, data are channel coded prior to being recorded. This involves representing each 8 bit byte by a run of ones and zeros that is longer than 8 bits. In the DVD format, each 8 bit byte is channel coded to a sixteen bit word. The reason for this is to allow additional constraints on the sequence of ones and zeros that are recorded (i.e. on the bit pattern). Typically, these constraints involve restricting the maximum number of zeros that can occur, and the minimum number of zeros, between two successive ones. Furthermore, channel coding schemes typically allow some control over the bit stream by allowing some choices during the channel coding process. This is done primarily to allow control over the low frequency content of the recovered signal when the bit stream is being read. In the case of the CD format, this choice is made with respect to the three merge bits between successive 14 bit channel codewords. In the case of the DVD format, some of the channel codewords have alternative or substitute codewords available. The encoder can choose either a codeword or its alternative, depending on which best reduces the low frequency content. See K. A. Schouhamer Immink, *EFMPlus: The Coding Format of the Multimedia Compact Disc.*, IEEE Transactions on Consumer Electronics, vol. 41, no. 3 (August 1995).

With respect to FIG. 3, this scheme consists of a table 304 (here the first nine entries are shown) that translates 8-bit data 301 into 16-bit data 302. There are four 16-bit choices 303 for each 8-bit value 301. The 16-bit values are selected from the four possible choices 303 depending upon the preceding data.

Figure 4:
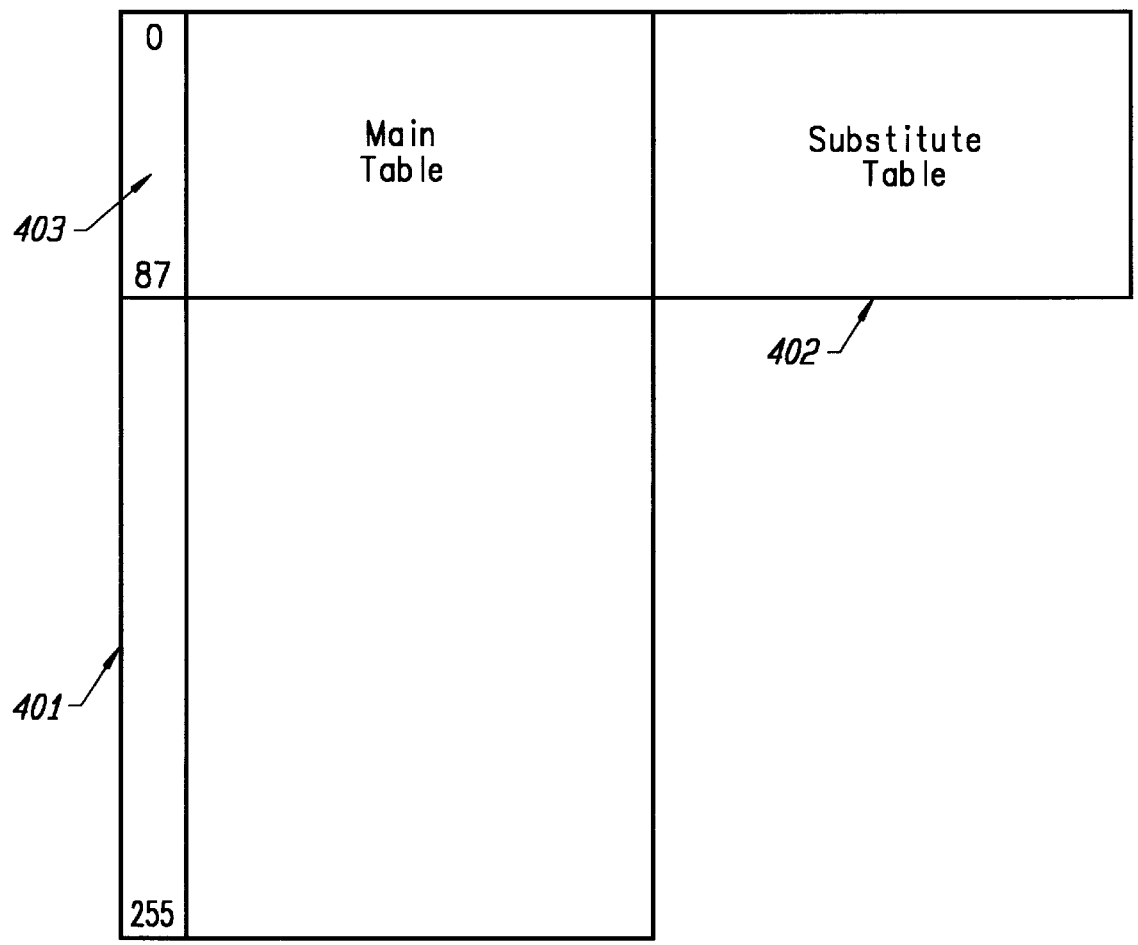
FIG. 4 is a block diagram showing the EFMPlus codeword table layout.

Referring to FIG. 4, the coding is well defined in a table form, where the main table 401 covers the translations for the 8 bit range of zero to 255. The coding scheme has an alternate table called the substitute table 402 that may be used for the first 88 bytes 403 of the main table 401. The user may choose either codeword. The difference between the two tables is that one table tends to accumulate the DC level, or low frequency in one direction, while the other does so in the other direction. Statistically there is frequently no significant advantage in choosing a codeword or its alternative and so the encoder is free to make the choice based on other criteria. Furthermore, frequently a choice in codeword affects both the polarity and state of the following codeword, which in turn can affect the codeword following it. In this manner, a single choice can have an affect on a substantial section of the following bit pattern.

In an embodiment of the invention that is used for the DVD format, some of the choices of codewords that are available are used to provide different bit patterns for the same data sequence. Thus, when rewriting the same data, such as occurs when writing block headers or rewriting the same data block, the actual bit pattern used is different from the previous bit pattern that was written at the same location.

In a second embodiment of this invention, when data are rewritten that are the same as the previously written data, the actual point at which new writing commences does not have to be at the beginning of the data block. This is possible because in the ROM compatible format, data are rewritten in exactly the same location, so the old data are equally valid with the new data (since the new data are the same). For instance, because header information is typically always exactly the same, actual writing could commence at any data byte prior to the section where new data are different from old data. Similarly, when ending the writing of a block where the data are the same as was previously in the block, the actual point at which data stops being written can be varied, because (once again) the old data are identical to the new data and in the same location. This avoids having transitions from not writing to writing to not writing, occur at the same locations.

Thus, the problem of overwriting the same data leading to loss of data integrity is avoided in a manner that does not require a buffer area on the disc and that is therefore more efficient. It also allows the possibility of writing a disc with a format compatible with the DVD Read Only Memory (ROM) format.

In the case of a format having a buffer zone, the technique of using different bit patterns to represent the same data sequence may be used to reduce the size of the buffer zone. The buffer zone may still be required to vary the beginning and ending of writing locations.

Figure 5:
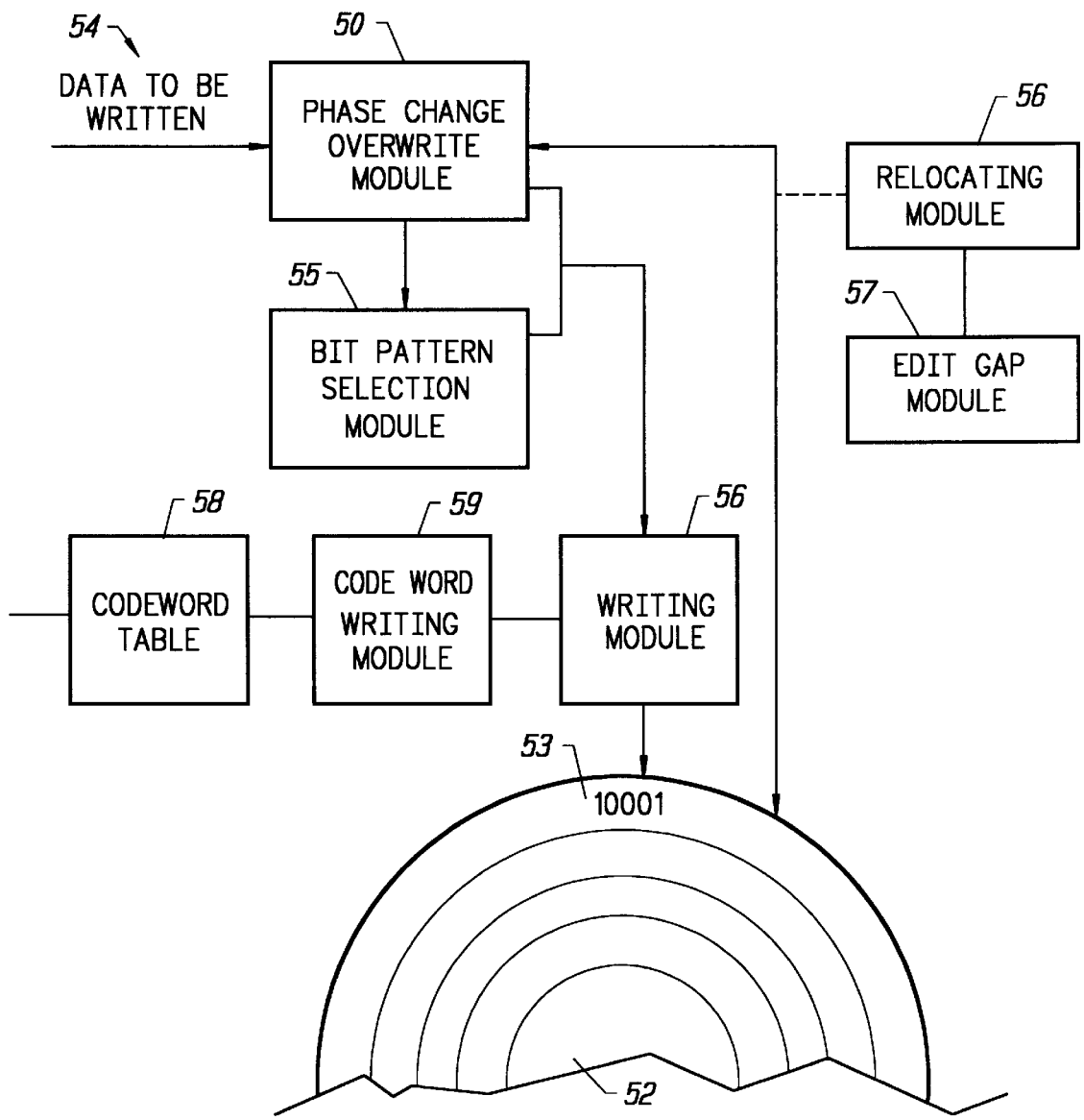
FIG. 5 is a block diagram showing an apparatus for repeated overwriting of data on phase changes media according to the invention.

FIG. 5 is a block diagram showing an apparatus for repeated overwriting of data on phase change media according to the invention. In FIG. 5, a phase change overwrite module 50 identifies when data 54 are to be rewritten that are identical to data 53 on the phase change media 52. A bit pattern selection module 55 is provided to allow a selection of a bit pattern for the data to be rewritten from a set of possible bit patterns. A writing module 56 is provided to write the data to be written to the phase change media in accordance with the selected bit pattern. The bit pattern selection module 55 may implement any number of schemes to prevent repeated overwriting of data on the phase change media. For example, the selecting module may invert the polarity of marks on the media area. The selecting module may alternatively select a codeword or an alternative from a codeword table 58. In the later case, a codeword writing module 59 is used in conjunction with the writing module 56 to write the codeword into the media area on the phase change media. Further, a module 56 may be provided for relocating a starting position for actual commencement of writing to any location on the phase change media within a data block and prior to a location at which the data to be rewritten are different from the data on the phase change media within the data block. The relocating module may also include a module 57 for determining if an edit gap exists on the phase change media. In this latter case, the relocating module 56 would relocate the starting position of the media area within the edit gap. Further, the bit pattern selection module 55 may provide a combination of techniques to prevent overwriting on the media. Thus, one embodiment in the invention provides for the inversion of polarity marks on the media in combination with selection of a codeword or an alternative from a codeword table to vary the bit pattern on the media area.

Although DVD formats have been discussed herein, one skilled in the art can readily appreciate that these techniques can be applied to other phase change media or their equivalents.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

I claim:

1. A process for repeated overwriting of data on phase change media, comprising the steps of:

identifying when data are to be rewritten that are identical to said data on said phase change media;

selecting different bit patterns for said identified data to be rewritten, each different bit pattern being selected from a set of possible bit patterns; and writing said data to be rewritten to said phase change media in accordance with said selected different bit patterns.

2. The process of claim 1, wherein said selecting step comprises:

inverting the polarity of marks on said media area.

3. The process of claim 1, wherein said selecting step comprises:

selecting a codeword or its alternative from a codeword table.

4. The process of claim 3, further comprising the step of:

writing an appropriate codeword into said media area on said phase change media.

5. The process of claim 1, further comprising the steps of:

determining if an edit gap exists on said phase change media; and relocating the starting position of said media area within said edit gap.

6. The process of claim 1, further comprising the step of:

relocating a starting position for actual commencement of writing to any location on said phase change media within a data block and prior to a location at which said data to be rewritten are different from said data on said phase change media within said data block.

7. The process of claim 1, wherein said selecting step comprises:

inverting the polarity of marks of said media area; and selecting a codeword or its alternative from a codeword table.

8. A process for repeated overwriting of data on phase change media, comprising the steps of:

identifying a starting location at which data to be rewritten changes from said data on said phase change media; and begin writing said data to be rewritten at the starting location on said phase change media;

wherein writing a portion of said data to be rewritten is skipped up to the starting location.

9. An apparatus for repeated overwriting of data on phase change media, comprising:

a phase change overwrite module for identifying when data are to be rewritten that are identical to said data on said phase change media;

a module for selecting different bit patterns for said identified data to be rewritten, each different bit pattern being selected from a set of possible bit patterns; and a module for writing said data to be rewritten to said phase change media in accordance with said selected different bit patterns.

10. The apparatus of claim 9, wherein said selecting module inverts the polarity of marks on said media area.

11. The apparatus of claim 9, wherein said selecting module selects a codeword or its alternative from a codeword table.

12. The apparatus of claim 11 further comprising:

a module for writing said appropriate codeword into said media area on said phase change media.

13. The apparatus of claim 9 further comprising:

a module for determining if an edit gap exists on said phase change media; and a module for relocating a starting position of said media area within said edit gap.

14. The apparatus of claim 9 further comprising:

a module for relocating a starting position for actual commencement of writing to any location on said phase change media within a data block and prior to a location at which said data to be rewritten are different from said data on said phase change media within said data block.

15. The apparatus of claim 8, wherein said selecting module inverts the polarity of marks on said media area in combination with selecting a codeword or its alternative from a codeword table to vary the bit pattern of said media area.

16. Apparatus for repeated overwriting of data on phase change media, comprising:

a module for identifying a starting location at which data to be rewritten changes from said data on said phase change media; and a module for writing said data to be rewritten beginning at the starting location on said phase change media;

wherein writing a portion of said data to be rewritten is skipped up to the starting location.

* * * * *